(12) United States Patent
Barnes

(10) Patent No.: US 11,119,778 B2
(45) Date of Patent: Sep. 14, 2021

(54) APPARATUS AND METHOD FOR CONTROLLING EXECUTION OF INSTRUCTIONS

(71) Applicant: ARM LIMITED, Cambridge (GB)

(72) Inventor: Graeme Peter Barnes, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/620,987

(22) PCT Filed: Jun. 20, 2018

(86) PCT No.: PCT/GB2018/051717
§ 371 (c)(1),
(2) Date: Dec. 10, 2019

(87) PCT Pub. No.: WO2019/008324
PCT Pub. Date: Jan. 10, 2019

(65) Prior Publication Data
US 2020/0201643 A1 Jun. 25, 2020

(30) Foreign Application Priority Data
Jul. 4, 2017 (GB) .................................. 1710733

(51) Int. Cl.
*G06F 9/32* (2018.01)
*G06F 9/30* (2018.01)
(Continued)

(52) U.S. Cl.
CPC ............ *G06F 9/321* (2013.01); *G06F 9/3004* (2013.01); *G06F 9/3013* (2013.01);
(Continued)

(58) Field of Classification Search
None
See application file for complete search history.

(56) References Cited

U.S. PATENT DOCUMENTS 5,758,115 A * 5/1998 Nevill .................... G06F 9/321
712/209
9,239,801 B2 * 1/2016 Patel ...................... G06F 8/434
(Continued)

FOREIGN PATENT DOCUMENTS

EP 0 026 590 4/1981
GB 2448149 A * 10/2008 ............. G06F 9/322
(Continued)

OTHER PUBLICATIONS

Robert Bedichek, "Some Efficient Architecture Simulation Techniques," Proceedings of the Winter 1990 USENIX Conference, Jan. 22-26, 1990, 12 pages.
(Continued)

*Primary Examiner* — Steven G Snyder
(74) *Attorney, Agent, or Firm* — Nixon & Vanderhye, P.C.

(57) ABSTRACT

An apparatus has processing circuitry to execute a sequence of instructions, an integer storage element to store an integer value for access by the processing circuitry, and a capability storage element for storing a capability for access by the processing circuitry. A capability usage storage is then used to store capability usage information. The processing circuitry is responsive to execution of at least one instruction in the sequence of instructions to generate, in dependence on the capability usage information, a result to be stored in a destination storage element, when the capability usage information identifies a capability state, the result is generated as a capability, and the capability storage element is selected as the destination storage element, and when the capability usage information identifies a non-capability state, the result is generated as an integer value, and the integer storage element is selected as the destination storage element.

20 Claims, 14 Drawing Sheets

(51) Int. Cl.
*G06F 9/34* (2018.01)
*G06F 9/38* (2018.01)
*G06F 21/74* (2013.01)

(52) U.S. Cl.
CPC ...... *G06F 9/30054* (2013.01); *G06F 9/30105* (2013.01); *G06F 9/30189* (2013.01); *G06F 9/322* (2013.01); *G06F 9/34* (2013.01); *G06F 9/3861* (2013.01); *G06F 21/74* (2013.01)

(56) References Cited

U.S. PATENT DOCUMENTS

| | | | |
|---|---|---|---|
| 10,768,938 B2 * | 9/2020 | Grocutt | G06F 9/34 |
| 2012/0151185 A1 * | 6/2012 | Bybell | G06F 9/3802 |
| | | | 712/205 |
| 2013/0326193 A1 * | 12/2013 | McCarthy | G06F 9/321 |
| | | | 712/207 |
| 2014/0365742 A1 * | 12/2014 | Patel | G06F 21/52 |
| | | | 711/163 |
| 2019/0079770 A1 * | 3/2019 | Grocutt | G06F 9/3806 |
| 2020/0004953 A1 * | 1/2020 | Lemay | G06F 9/45516 |
| 2020/0050454 A1 * | 2/2020 | Barnes | G06F 9/324 |
| 2020/0142700 A1 * | 5/2020 | Barnes | G06F 9/3013 |

FOREIGN PATENT DOCUMENTS

| | | | | |
|---|---|---|---|---|
| GB | 2541714 | | 3/2017 | |
| GB | 2544315 | | 5/2017 | |
| GB | 2544996 | | 6/2017 | |
| GB | 2544996 A | * | 6/2017 | ........... G06F 9/3861 |
| GB | 2548604 A | * | 9/2017 | ............ G06F 9/322 |
| GB | 2562102 | | 11/2018 | |
| WO | 2017/093708 | | 6/2017 | |

OTHER PUBLICATIONS

"MIPS® Architecture for Programmers vol. II-B: microMIPS64™ Instruction Set", Document No. MD00594, Revision 6.04, Jun. 6, 2016, 467 pages.
Combined Search and Examination Report for GB Application No. 1710733.5 dated Jan. 9, 2018, 7 pages.
International Search Report and Written Opinion of the ISA for PCT/GB2018/051717 dated Oct. 2, 2018, 16 pages.
Examination Report for GB Application No. 1710733.5 dated Jan. 29, 2020, 3 pages.
Office Action for EP Application No. 18737360.0 dated Nov. 24, 2020, 5 pages.
Robert N.M. Watson et al, "Capability Hardware Enhanced Risc Instructions: CHERI Instruction-Set Architecture (Version 6)" University of Cambridge, Computer Laboratory, Technical Report No. 907, Apr. 2017, 307 pages.

* cited by examiner

PER EL CAPABILITY CONFIGURATION

| MANAGE CAPABILITIES (M BIT) 310 | AFFECTED BY CAPABILITIES (A BIT) 305 | SOFTWARE EXECUTING AT EL |
|---|---|---|
| 0 | 0 | LEGACY |
| 1 | 0 | MANAGE CAPABILITIES THAT MAY BE USED TO AFFECT LOWER EXCEPTION LEVELS |
| 1 | 1 | MANAGE CAPABILITIES AND AFFECTED BY CAPABILITIES |
| 0 (OPTION FOR EL0) | 1 | OPTIONAL STATE FOR EL0 (S/W IS AFFECTED BY CAPABILITIES BUT DOES NOT MANAGE CAPABILITIES) |

| 325 | 330 | 335 | 340 |
|---|---|---|---|
| M BIT FOR $EL_P$ | A BIT FOR $EL_P$ | M BIT FOR $EL_Q$ | A BIT FOR $EL_Q$ |
| 0 | TO BE TREATED AS 0 | TO BE TREATED AS 0 | TO BE TREATED AS 0 |
| 1 | 0 | 0 | TO BE TREATED AS 0 (OPTIONALLY CAN BE 1 FOR EL0) |
| 1 | 0 | 1 | 0 |
| 1 | 0 | 1 | 1 |
| 1 | 1 | 0 | TO BE TREATED AS 0 (OPTIONALLY CAN BE 1 FOR EL0) |
| 1 | 1 | 1 | 0 |
| 1 | 1 | 1 | 1 |

APPARATUS AND METHOD FOR CONTROLLING EXECUTION OF INSTRUCTIONS

This application is the U.S. national phase of International Application No. PCT/GB2018/051717 filed Jun. 20, 2018 which designated the U.S. and claims priority to GB Patent Application No. 1710733.5 filed Jul. 4, 2017, the entire contents of each of which are hereby incorporated by reference.

The present technique relates to an apparatus and method for controlling execution of instructions.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer"). For a bounded pointer, the pointer value may identify, or be used to determine, the address of a data value to be accessed or an instruction to be executed, for example. However, the pointer value may also have associated range information which indicates an allowable range of addresses when using the pointer value, and may additionally have permissions/restrictions information associated therewith. The range information and any permissions/restrictions information for a bounded pointer may be referred to as capability information, and within a capability-based architecture such a bounded pointer (including its associated capability information) may be referred to as a capability.

Within an instruction set, it is desirable to specify instructions that can generate a capability as the result of executing those instructions. However, for backwards compatibility, it may also be desirable to specify an instruction that identifies essentially the same operation as the version that generates a capability as a result, but instead generates a normal data value as a result instead of a capability.

However, instruction encoding space is often at a premium, and accordingly it can be difficult to provide sufficient space within the instruction set architecture to allow for capability generating instructions and non-capability generating instructions to be defined.

In a first example configuration, there is provided an apparatus comprising: processing circuitry to execute a sequence of instructions; an integer storage element to store an integer value for access by the processing circuitry; a capability storage element to store a capability for access by the processing circuitry; and a capability usage storage to store capability usage information; wherein the processing circuitry is responsive to execution of at least one instruction in the sequence of instructions to generate, in dependence on the capability usage information, a result to be stored in a destination storage element, by: when the capability usage information identifies a capability state, generating the result as a capability and selecting the capability storage element as the destination storage element; and when the capability usage information identifies a non-capability state, generating the result as an integer value and selecting the integer storage element as the destination storage element.

In another example configuration, there is provided a method of controlling execution of instructions within an apparatus having processing circuitry to execute a sequence of instructions, an integer storage element to store an integer value for access by the processing circuitry, a capability storage element to store a capability for access by the processing circuitry, and a capability usage storage to store capability usage information, the method comprising: responsive to execution of at least one instruction in the sequence of instructions, generating, in dependence on the capability usage information, a result to be stored in a destination storage element, by: when the capability usage information identifies a capability state, generating the result as a capability and selecting the capability storage element as the destination storage element; and when the capability usage information identifies a non-capability state, generating the result as an integer value and selecting the integer storage element as the destination storage element.

In a yet further example configuration, there is provided an apparatus comprising: processing means for executing a sequence of instructions; integer storage element means for storing an integer value for access by the processing means; capability storage element means for storing a capability for access by the processing means; and capability usage storage means for storing capability usage information; the processing means, responsive to execution of at least one instruction in the sequence of instructions, for generating, in dependence on the capability usage information, a result to be stored in a destination storage element means, by: when the capability usage information identifies a capability state, generating the result as a capability and selecting the capability storage element means as the destination storage element means; and when the capability usage information identifies a non-capability state, generating the result as an integer value and selecting the integer storage element means as the destination storage element means.

In a still further example configuration there is provided a computer program for controlling a host data processing apparatus to provide an instruction execution environment comprising: processing program logic to execute a sequence of instructions; an integer data structure to store an integer value for access by the processing program logic; a capability data structure to store a capability for access by the processing program logic; and a capability usage data structure to store capability usage information; wherein the processing program logic is responsive to execution of at least one instruction in the sequence of instructions to generate, in dependence on the capability usage information, a result to be stored in a destination data structure, by: when the capability usage information identifies a capability state, generating the result as a capability and selecting the capability data structure as the destination data structure; and when the capability usage information identifies a non-capability state, generating the result as an integer value and selecting the integer data structure as the destination data structure.

In a further example configuration, there is provided a virtual machine computer program comprising program instructions to control a host data processing apparatus to provide an instruction execution environment corresponding to the apparatus of the first example configuration discussed above.

In one embodiment a computer-readable storage medium may be provided for storing the computer program.

The present technique will be described further, by way of example only, with reference to embodiments thereof as illustrated in the accompanying drawings, in which:

FIG. 5 illustrates one form of per exception level capability configuration information that may be provided in accordance with one embodiment;

FIG. 6 is a table illustrating possible options for the capability configuration information for two different exception levels in accordance with one embodiment;

Figure 1:
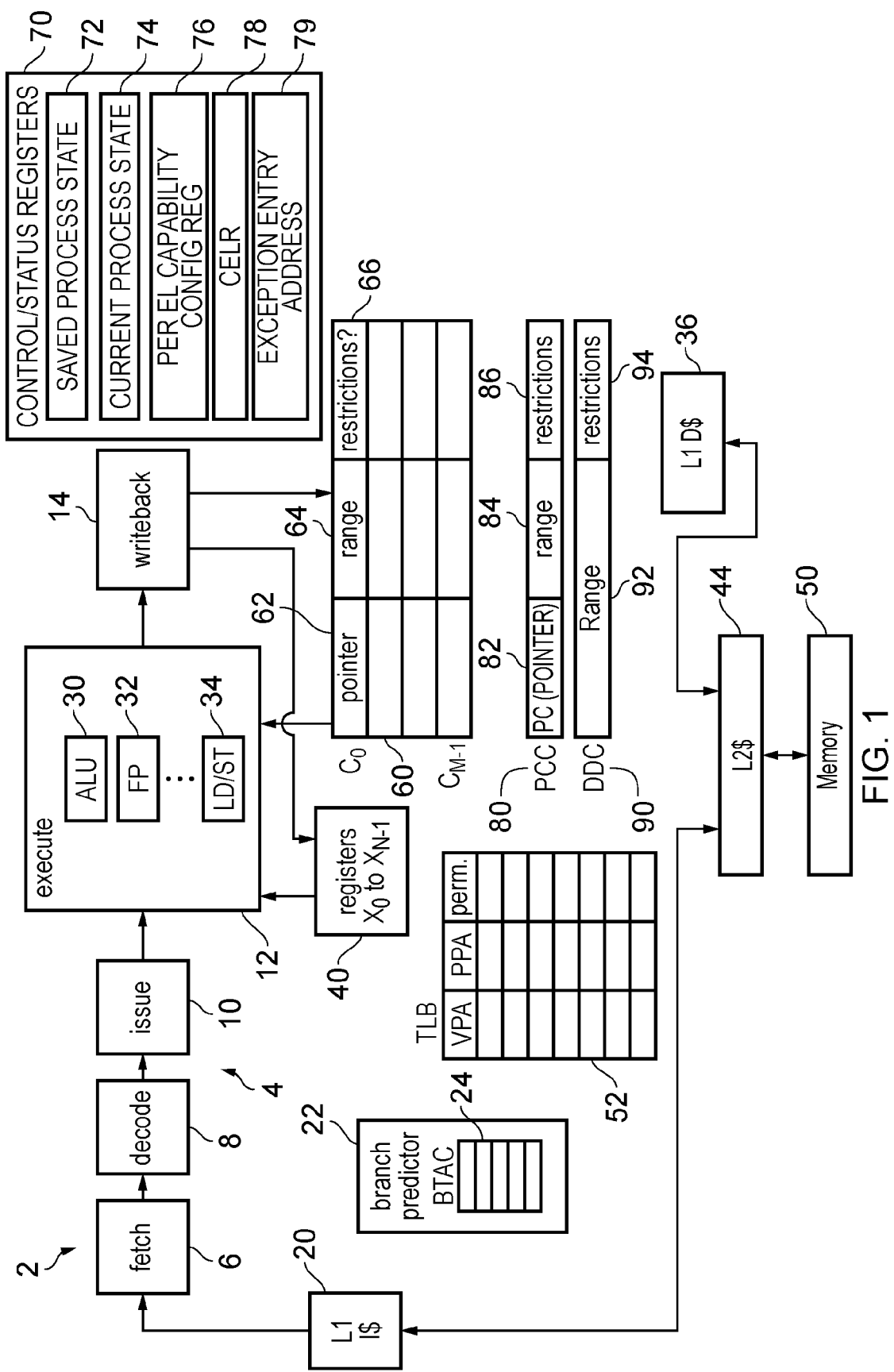
FIG. 1 is a block diagram of an apparatus in accordance with one embodiment.

Before discussing the embodiments with reference to the accompanying figures, the following description of embodiments is provided.

As mentioned earlier, there is an increasing interest in capability-based architectures in which certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information). An apparatus adopting such a capability-based architecture will typically have storage elements (also referred to herein as bounded pointer storage elements, or more generally capability storage elements) that are used to store the capabilities. The storage elements can be registers (also referred to herein as bounded pointer registers or capability registers) and/or can be memory locations in general purpose memory, for example a location on a stack memory. Certain instructions can be used to reference such storage elements in order to access a desired capability, and perform operations dependent on that capability. For example, considering a bounded pointer, execution of such an instruction can cause the bounded pointer to be retrieved, and for the pointer value therein to then be used to derive an address in memory required during execution of the instruction. The pointer value may be used directly to identify the memory address, or may be used to derive the memory address, for example by the addition of an offset to the pointer value. The operation will then be allowed to proceed provided that the memory address is within the range specified by the range information, and any permissions specified in the permissions information are met.

In addition, it is desirable for at least some instructions to generate capabilities as the result of the operations performed when executing those instructions. Further, for at least some of those instructions, it may still be desirable to provide a version of the instruction that produces a non-capability result, so as for example to support backwards compatibility.

However, to specify two separate instructions that essentially perform the same operation, but where one produces a capability as a result, and the other produces a normal data value as a result, there needs to be sufficient instruction encoding space within the instruction set architecture to define these different instructions. However, instruction encoding space is typically tightly constrained, and it can be difficult to encode within the instruction set architecture all of the different types of instructions that are desired.

The embodiments described herein provide a mechanism for alleviating the pressure on instruction encoding space.

In particular, in one embodiment an apparatus is provided that comprises processing circuitry for executing a sequence of instructions, an integer storage element to store an integer data value for access by the processing circuitry, and a capability storage element to store a capability for access by the processing circuitry. Further, capability usage storage is provided to store capability usage information.

For at least one instruction in the sequence of instructions, the processing circuitry is responsive to execution of that instruction to generate, in dependence on the capability usage information, a result to be stored in a destination storage element. In particular, when the capability usage information identifies a capability state, the processing circuitry generates the result as a capability, and selects the capability storage element as the destination storage element. Conversely, when the capability usage information identifies a non-capability state, the processing circuitry generates the result as an integer value and selects the integer storage element as the destination storage element.

By such an approach, a single instruction within the instruction set can configurably be arranged during execution to either generate a capability as a result or an integer value as a result, and further the destination for the result can also be configurably selected dependent on whether a capability or an integer value is being generated. In particular, during execution of the instruction, the processing circuitry can have reference to capability usage information, and use the current capability usage information to control whether a capability is produced as a result of execution of the instruction or an integer value is instead produced. This can allow both capability and non-capability variants of an instruction to be executed, but without requiring those variants to be encoded separately within the instruction set.

The integer storage element can take a variety of forms, but in one embodiment is one of a selected integer storage element of a plurality of integer storage elements, a program counter storage element, and a link storage element. Similarly, the capability storage element can also take a variety of forms, but in one embodiment is one of a selected capability storage element of a plurality of capability storage elements, a program counter capability storage element, and a capability link storage element.

Whilst the integer storage elements and the capability storage elements may be physically separate structures, in one embodiment, it is possible for an integer storage element to be represented by a field within a capability storage element, thus reducing the overall storage requirements of the apparatus.

The instructions that are processed in the above described manner by the processing circuitry so that the result generated is a capability or an integer value, depending on the capability usage information, can take a variety of forms. However, in one embodiment at least one such instruction is an instruction that specifies an immediate value as a source operand. The immediate value can consume a significant number of bits within the available encoding space of the instruction, and accordingly the above described techniques may be particularly beneficial when used in association with instructions that specify an immediate value as the source operand, since there can be insufficient remaining encoding space to provide two separate variants of the instruction.

However, in other embodiments the technique can also be used with instructions that do not specify an immediate value as a source operand, and hence instructions that might for example specify a source operand with reference to a general purpose register.

In one embodiment, the at least one instruction that the processing circuitry executes in the above described manner is an instruction that is arranged to use program counter information as a further source operand. There are a number of instructions that use program counter information as a source operand, where it would be desirable to be able to generate a result that is either a capability or an integer value, and accordingly the above described techniques provide a very efficient way for encoding such instructions, by avoiding the need to specifically define multiple different variants of each such instruction.

The result generated by the processing circuitry when executing said at least one instruction can take a variety of forms, but in one embodiment the result generated is address information. It can be beneficial in capability based architectures to generate address information in the form of a capability, so as to tightly constrain how that address information is then used. However, for backwards compatibility, it is still often desirable to be able to generate address information in the form of an integer value, and the above described techniques provide a particularly efficient mechanism for supporting both variants without needing to specify separate instructions for those variants.

The at least one instruction can take a variety of forms but in one embodiment is a branch instruction used to update program counter information.

In particular, in one embodiment, the processing circuitry is arranged in response to the branch instruction to generate, as at least one result, updated program counter information, the processing circuitry being arranged, in dependence on the capability state, to generate the updated program counter information as a program counter capability for storage in a program counter capability storage element or to generate the updated program counter information as a program counter value for storage in a program counter storage element.

There are a number of ways in which the updated program counter information may be generated, but in one embodiment this is generated by adjusting a current program counter value in dependence on an immediate value specified by the branch instruction. As mentioned earlier, the immediate value can consume a significant number of bits within the instruction encoding space, and accordingly using the above described techniques in association with a branch instruction that specifies an immediate value as a source operand can be particularly beneficial. In alternative embodiments however, an immediate value may not be specified, and instead the branch instruction may use the contents of a register to specify an absolute branch destination, or an offset to be used in combination with the program counter to provide a program counter relative branch destination.

Whilst in one embodiment the program counter storage element may be physically separate to the program counter capability storage element, in one embodiment the program counter storage element is formed by a field within the program counter capability storage element.

In one example arrangement, the branch instruction may be a branch with link instruction, and the processing circuitry may be arranged to generate, as at least one result, return address information derived from current program counter information, the processing circuitry being arranged, in dependence on the capability state, to generate the return address information as a return address capability for storage in a capability link storage element or to generate the return address information as a return address value for storage in a link storage element. Hence, in such an example, both the updated program counter information and the return address information can be produced as either a capability or an integer value, dependent on the capability usage information.

In one embodiment, the processing circuitry may be arranged to generate the return address information by modifying a current program counter value, for example by adding an offset to that current program counter value.

The link storage element may be physically separate to the capability link storage element, but in one embodiment may be formed by a field within the capability link storage element.

As an alternative to, or in addition to, performing the above described configurable result generation for branch instructions, the processing circuitry may also be arranged to take similar steps for other types of instructions. For example, the at least one instruction may be an address generation instruction used to generate, as the result, address information derived from program counter information. Again, it is useful for such address generation instructions to be able to generate the address information as a capability, but also, for backwards compatibility, to support the generation of that address information as an integer value.

In one particular example arrangement, the processing circuitry may be arranged to generate the address information by adjusting a current program counter value in dependence on an immediate value specified by the address generation instruction. However, as with the earlier discussion of branch instructions, other variants that do not use an immediate value may also be arranged to take advantage of the configurable execution behaviour discussed herein.

There are a number of ways in which the destination to be used to store the result generated by execution of the address generation instruction can be determined. In one embodiment, the address generation instruction provides a destination identifier, and the processing circuitry is arranged to map that destination identifier to a selected capability storage element of a plurality of capability storage elements when the capability usage information identifies the capability state, and to map that destination identifier to a selected integer storage element of a plurality of integer storage elements when the capability usage information identifies the non-capability state.

Irrespective of the type of instruction to which the present techniques are applied, when the integer storage element is formed by a field within the capability storage element, there are a number of ways in which the contents of the capability storage element can be flagged to identify that the integer value is stored therein as the result instead of the capability. In one embodiment, when the integer value is stored as the result instead of the capability, at least one remaining field of the capability storage element is set to a default value. In particular, in one embodiment the remaining fields (which may for example specify range and restriction information) are set to identify a maximum capability, so as to effectively turn off any capability constraints. However, in an alternative embodiment it may not be necessary to set the range and restriction information to identify the maximum capability. For example, the hardware may be arranged so that when the apparatus is operating in the non-capability state, and hence the processing operations performed are not affected by capabilities, it ignores the range and restriction information within the capability storage element. In such situations the range and restriction information may instead be left unchanged, or cleared, as desired. As a further alternative, a tag bit may be associated with each capability storage element, which is set to identify that the contents contain a capability, and is cleared to identify that the contents do not represent a valid capability. Accordingly, when the capability storage element stores an integer value, the tag bit may be cleared to identify that the contents do not represent a valid capability.

The capability stored as a result can take a variety of forms, but in one embodiment comprises a bounded pointer.

The capability usage information referred to by the processing circuitry when executing said at least one instruction can take a variety of forms. However, in one embodiment the capability usage information is capability configuration information for each of a plurality of exception levels, each exception level having different software execution privilege, and for each exception level the capability configuration information identifying at least whether the operations performed by the processing circuitry when executing instructions at that exception level are constrained by capabilities. This hence provides the flexibility to allow software at at least one exception level to be unconstrained by capabilities if desired. As a particular example, highly trusted software executing at a high exception level may be allowed to operate unconstrained by capabilities. This can give rise to performance benefits by avoiding the need to perform capability checking routines for such software. It can also reduce the extent to which such software needs to be modified to make it compatible with capability-based architectures. However, since such flexibility can be managed on a per exception level basis, such a mechanism can still be used to ensure that the full constraints of capabilities are imposed on software executing at one or more of the exception levels.

Further, in accordance with the techniques described above, this information can be re-used when executing one or more instructions, so as to configurably enable the result of an instruction to be formed as a capability or an integer value, and further for the destination used to store that result to be configurably selected as a capability storage element or an integer storage element.

Particular embodiments will now be described with reference to the Figures.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
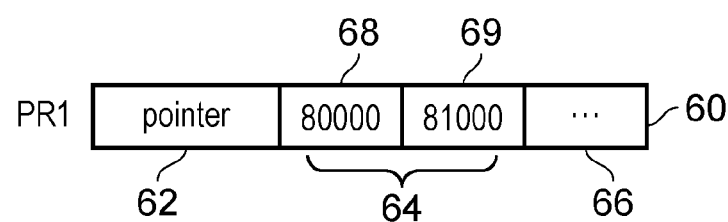
FIG. 2 shows examples of types of instruction for which an error may be triggered if there is an attempt to set or access a pointer value within a set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception levels of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Further, in one embodiment non-bounded pointers may also be specified within the general purpose registers 40 and used when performing memory accesses. To limit memory addresses that may be accessed using such non-bounded pointers, a Default Data Capability (DDC) register 90 may be provided that specifies both range information 92 and any restriction data 94, similar to the range and restriction information included within any of the capability registers. Then, when a memory access instruction is executed that identifies a memory address with reference to a non-bounded pointer in a general purpose register 40, a bound check operation similar to the bound check operation performed in respect of bounded pointers can still be performed based on any address derived from that non-bounded pointer, but in this instance having regards to the range and restriction information held within the DDC register 90. By such an approach, it is possible for example for capability aware code that wishes to utilise some capability unaware code in an existing software library to set the DDC register 90 so as to place constraints on how pointers accessed from the general purpose register 40 are used when executing that capability unaware code. In particular, the range information can be used to limit the address range that can be accessed when executing such capability unaware code.

Any particular range of memory addresses identified by a bounded pointer within a bounded pointer register may contain data, instructions and/or other capabilities (i.e. other bounded pointers). Hence, it will be appreciated that at any point in time the processing circuitry's ability to access memory is defined by a set of capabilities comprising the capabilities identified in the bounded pointer registers and any further capabilities accessible via the capabilities held in those bounded pointer registers, and this set of capabilities will be referred to herein as a capability domain.

The range information and any associated restrictions specified in the PCC register 80 or the DDC register 90 can be set in a variety of ways. However, in one embodiment that information is determined using one or more of the bounded pointers available to the processing circuitry in a current capability domain, so that no memory address can be accessed using PCC or DDC based bound checks that resides outside the memory address range(s) identified for the current capability domain.

Figure 3:
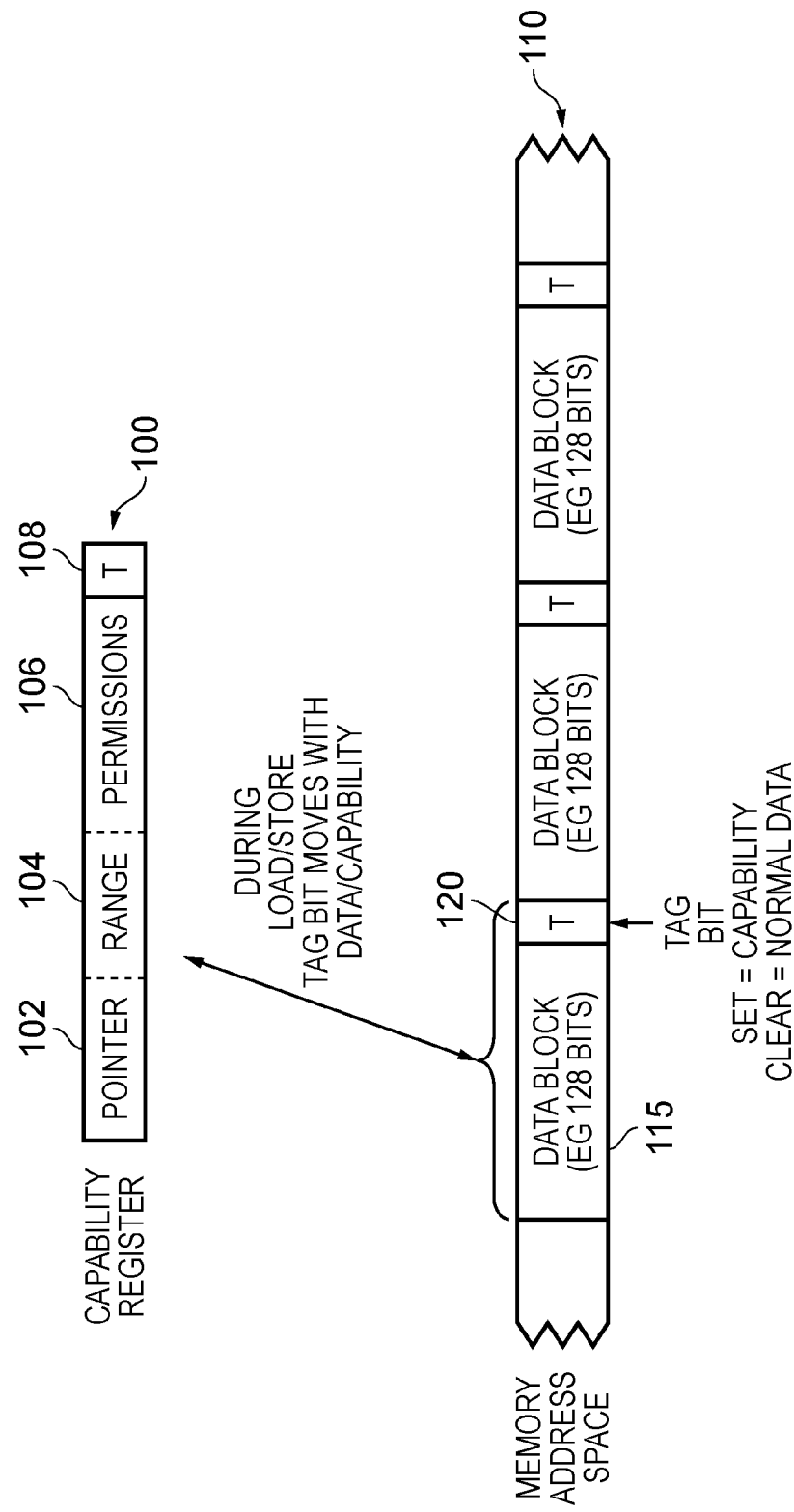
FIG. 3 illustrates the use of tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

In the illustrated embodiments, the apparatus is arranged so that it can operate at different exception levels, where each exception level has different software execution privilege. Further, an exception mechanism is used to transition between the plurality of exception levels. In particular, during exception entry or exception exit, a switch operation can be performed to switch from a source exception level to a target exception level. As shown in FIG. 1, the apparatus 10 has access to a variety of control/status registers 70 which store various control and status information referenced by the processing circuitry during its operation, the control/status registers 70 including a variety of registers that are used during performance of the above-mentioned switch operation.

As shown in FIG. 1, current process state 74 is maintained within the control/status registers 70, to capture a variety of execution state information relating to the processor's current operation. While shown as a single box 74, the current process state will not necessarily all be stored within a single register, but may be stored within a number of control and status registers within the available control/status registers 70.

During operation, an exception may be triggered by a variety of different mechanisms, for example an interrupt, a system call, a fault, etc. In accordance with one embodiment, when an exception is taken, an exception entry mechanism is triggered as part of the switch operation, and during this process the current process state 74 is captured as saved process state 72. Again, the saved process state 72 may be stored within a single register, or within multiple registers. An exception handling operation is then performed by the processing circuitry to process the exception. When the processing circuitry subsequently returns from the exception, the saved process state will be restored into the current process state, allowing the processing circuitry to continue the operations that it was performing prior to the exception being taken.

To enable execution state of the processing circuitry to be maintained for multiple exception levels, separate saved process state registers (SPSRs) 72 and current process state registers (CPSRs) 74 can be maintained for multiple of the exception levels if desired.

Figure 4:
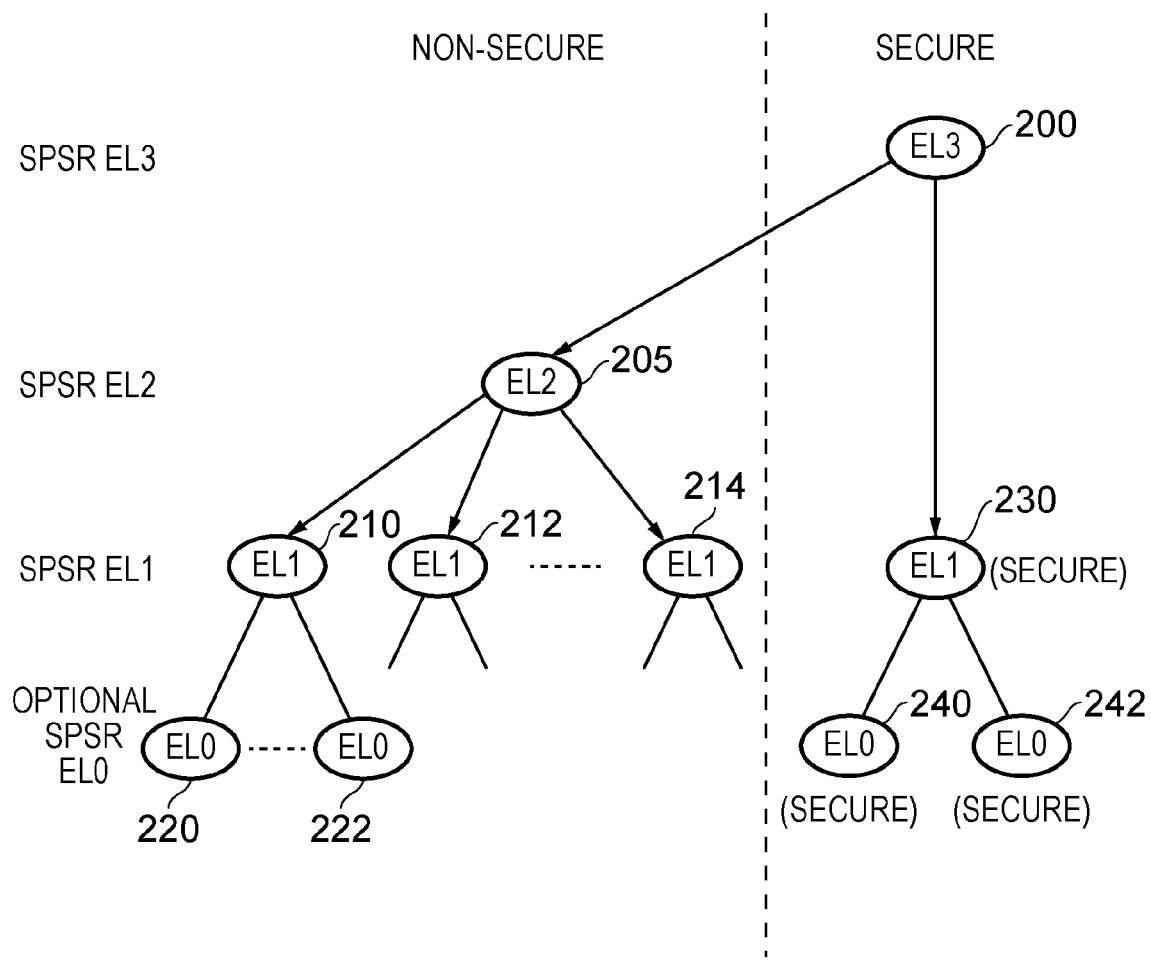
FIG. 4 illustrates how multiple exception levels may be provided in accordance with one embodiment.

FIG. 4 illustrates the interrelationship between the various exception levels in one embodiment. The exception level EL0 has the lowest software execution privilege, and execution at EL0 is called unprivileged execution. Increased values of n, from 1 to 3, indicate increased software execution privilege. The EL2 exception level provides support for processor virtualisation. Meanwhile the EL3 stage provides support for two security states, namely the secure and the non-secure states.

This gives rise to the general tree structure shown in FIG. 4. In particular, if an EL3 exception level is provided, such as EL3 200 shown in FIG. 4, it will run in a secure state. In the non-secure state, it is possible if desired to support virtualisation, and accordingly an EL2 exception level 205 may be provided in the non-secure state. Within the secure state, in one embodiment, an EL2 level is not provided, and instead an EL1 level 230 may be provided within the secure state, under which a number of different EL0 levels 240, 242 may be provided.

In the non-secure state, if an EL2 level 205 is provided, it may support beneath that multiple EL1 levels 210, 212, 214, and each of those EL1 levels may support one or more EL0 levels, as shown schematically by the reference numerals 220, 222.

Transitions between the various exception levels take place via the taking of exceptions. However, not all exceptions will cause the exception level to change. For example, in one embodiment exceptions from EL0 are usually taken in EL1 (although in some configurations EL2). Exceptions from EL1 and above may in one embodiment generally be taken in the same exception level. However, various exceptions from EL1 to EL2/EL3 and from EL2 to EL3 may also be provided and can be used for a similar purpose. Exceptions in EL3 are always taken in EL3 in one embodiment. As shown in FIG. 4, saved process state registers can be provided in association with each of the exception levels. If it is always the case that exceptions from EL0 are taken in EL1, then there is no need for a separate SPSR in association with the EL0 level. However, in one embodiment it may be arranged that certain exceptions from EL0 can be taken in the EL0 level, and in that event a separate SPSR register for EL0 may be provided.

As will be described with reference to the remaining figures, in the embodiments described herein a flexible technique for managing the use of capabilities has been developed for use with processing circuitry of the type that allows operation at multiple exception levels.

In particular, as shown in FIG. 1 the control/status register 70 include per exception level capability configuration register(s) 76 for storing capability configuration information for each exception level. The capability configuration information can capture a variety of different types of information, but in one embodiment identifies at least whether operations performed by the processing circuitry when executing instructions at that exception level are constrained by capabilities or not.

By being able to specify such capability configuration information on an exception level-by-exception level basis, this provides the flexibility to allow software at at least one exception level to be unconstrained by capabilities if desired. Hence, for example, highly trusted software executing at a high exception level may be allowed to operate unconstrained by capabilities, which can give rise to performance benefits by avoiding the need to perform capability checking routines for such software. It can also reduce the extent to which such software needs to be modified to make it compatible with capability-based architectures. Indeed, in some embodiments the mechanism can allow legacy, capability-unaware, software to be executed at at least one exception level.

FIG. 5 is a table schematically illustrating the per exception level capability configuration information captured within the register(s) 76 in accordance with one embodiment. In this embodiment, the registers 300 may comprise a two bit field for each exception level. The first field 305 can identify whether the associated exception level is affected by capabilities, this field also being referred to herein as the "A" bit. Hence, this bit identifies whether, when software is executing at the associated exception level, that software is or is not constrained by capabilities. In the example illustrated in FIG. 5, a value of "0" indicates that the software is not constrained by capabilities, and a value of "1" indicates that it is constrained by capabilities. However, it will be appreciated that in other embodiments the meaning of a logic zero value and a logic one value can be reversed if desired.

Whilst in one embodiment the per exception level capability configuration information may comprise only the field 305, in an alternative embodiment an additional field 310 is provided to identify whether software executing at the associated exception level can manage capabilities that are then used to constrain operations performed by the processing circuitry at one or more lower exception levels. Optionally, this information may also identify whether the software executing at a particular exception level can also manage capabilities used to constrain operations performed by the processing circuitry at the same exception level. For example, in one embodiment it may be possible to arrange for software executing at a particular exception level to be executed in different "compartments", with the software executing in one compartment being able to manage capabilities that are then used to constrain operations performed by the software executing in another compartment. As a particular example, the software executing at a particular exception level may be able to operate in an executive state, or a restricted state, and software executing in one compartment in the executive state may be allowed to manage capabilities that are then used to constrain software executing in another compartment at the same exception level.

As shown in FIG. 5, the field 310 that is used to capture information about the ability of software executing at a particular exception level to manage capabilities may in one embodiment be referred to as the "M" bit.

As shown in FIG. 5, if both the A bit and the M bit are cleared, then this means that the software executing at the associated exception level may be legacy software, since that software is not only unaffected by capabilities, but also is unable to manage capabilities, and accordingly need not be modified to take into account the capability-based architecture of the apparatus.

As also shown in FIG. 5, another optional state is for the A bit to be cleared, but for the M bit to be set. This means that the software executing at the associated exception level is not affected by capabilities itself, but can be used to manage capabilities that are then used to constrain the operations performed by software executing at lower exception levels.

As another option, both the A bit and the M bit can be set. This means that the software executing at the associated exception level is affected by capabilities itself, and also is able to manage capabilities. As mentioned earlier, when the M bit is set this may in one embodiment indicate that the software executing at the associated exception level can manage capabilities that are then used to constrain operations performed by software at lower exception levels, but it may be that the software cannot manage capabilities for the same exception level. However, in an alternative embodiment it may also be allowed to manage, in some situations, the capabilities associated with the same exception level.

In one embodiment, only the first three sets of entries shown in FIG. 5 are valid states for the A and M bits. However, in an alternative embodiment, a further set of states as shown by the final entry in the table 300 may be available in some instances, for example in association with the lowest exception level EL0. In particular, in accordance with this state, the M bit is cleared but the A bit is set. This means that the software executing at that exception level cannot manage capabilities, but can be constrained by them. This may be an appropriate configuration to allow for the lowest exception level EL0, where there are no lower exception levels to be managed. As a particular concrete example, this would allow software executing at EL0 to be constrained by capabilities such as the program counter capability 80 and the DDC 90, typically after those capabilities have been set up by a higher exception level.

In one embodiment, the per exception level capability configuration registers 76 can be considered to be formed of a plurality of registers, each register "owned" by an associated exception level and containing the A and M bits for that exception level. These registers are accessed explicitly, with higher exception levels having access to the registers at that level and below. For example, the EL2 exception level has access to the capability configuration registers affecting EL2, EL1 and EL0. In one particular embodiment, the capability configuration for EL0 is itself configurably controlled by registers owned by either EL1 or EL2.

In one embodiment, the access to the capability configuration registers by each exception level can be controlled by any suitable mechanism. The values stored in the capability configuration registers accessible to a particular exception level can then in one embodiment be changed dynamically during operation, for example when switching between VM guests that are capability aware and unaware respectively.

FIG. 6 is a table 320 illustrating how capability configuration associated with a higher configuration level may affect the capability configuration available at a lower exception level. In this table, the M bit and A bit values for a higher exception level P are shown by the fields 325, 330, and the corresponding M bit and A bit for a lower exception level Q are shown by the fields 335, 340. In this embodiment, if the M bit is cleared (i.e. at a logic zero value) for exception level P, then this means that exception level P cannot be affected by capabilities (i.e. its A bit is also treated as being cleared, irrespective of its actual value), since it is not possible for a higher exception level to be affected by capabilities, whilst unable to configure capabilities at a lower exception level. The clearing of the M bit in the field 325 for exception level P also means that the M bit for exception level Q must be cleared (i.e. zero), since it is not possible for a lower exception level to manage capabilities if a higher exception level cannot manage them. As with exception level P, the clearing of the M bit in field 335 for exception level Q means that the A bit in field 340 is also treated as clear, for all purposes other than reading the value of the field 340.

The next three entries show situations where exception level P can manage capabilities, but is itself unaffected by them. In such an arrangement, each of the upper three entries shown in the table 300 of FIG. 5 are available in association with exception level Q. Further, as mentioned earlier with reference to FIG. 5, in one embodiment, if exception level Q is the lowest exception level, it may be possible for the M bit field 335 to be cleared and the A bit field 340 to be set so that exception level Q is constrained by capabilities, but not able to manage them.

The final three entries in FIG. 6 show the situation where both the M bit and the A bit are set for exception level P. Again, the upper three entries shown in the table 300 of FIG. 5 are available for exception level Q. Further, as mentioned earlier, where exception level Q is the lowest exception level, it may also be possible for the M bit to be cleared, but for the A bit to be set.

As mentioned earlier, on exception entry or exception exit/return, a switch operation can be performed to switch from a source exception level to a target exception level. In accordance with the described embodiments, having allowed the effects of capabilities to be varied on a per exception level basis, the apparatus also provides, as part of the switch operation, a mechanism that takes into account the possibility that the effects of capabilities are different between the source exception level and the target exception level. In particular, during a switch operation from a source exception level to a target exception level, the capability configuration information in the capability configuration storage pertaining to at least one of the source exception level and the destination exception level is used to determine how the execution state of the processing circuitry is managed during the switch operation. This process will be discussed in more detail with reference to FIGS. 7A, 7B and 8.

Figure 7A:
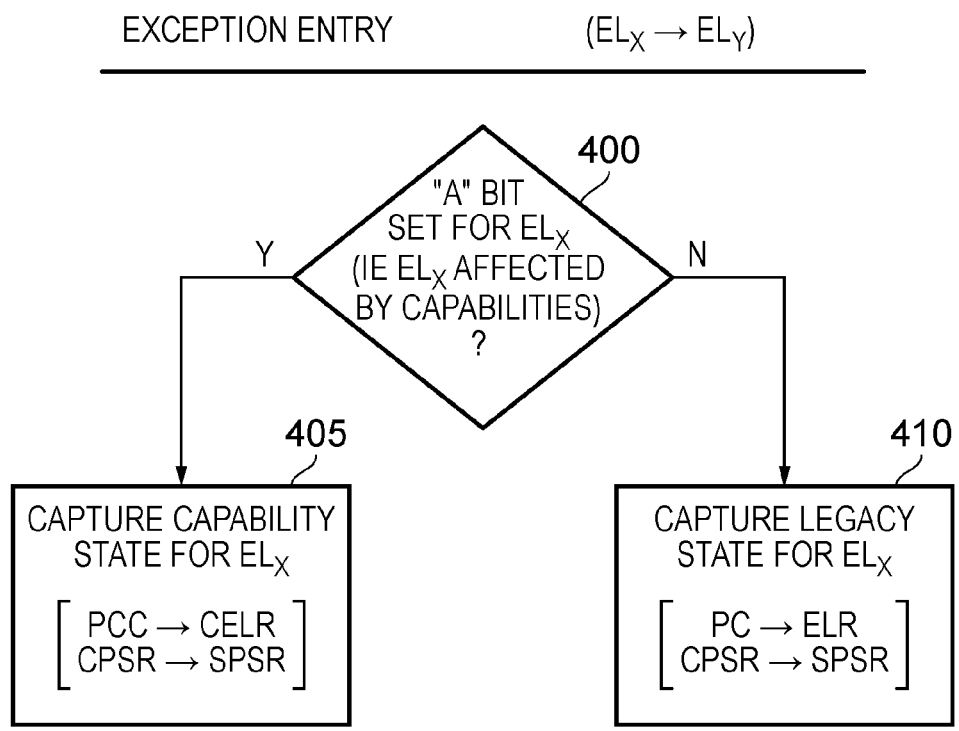
FIGS. 7A and 7B are flow diagrams illustrating how execution state of the processing circuitry is managed during an exception entry operation in accordance with one embodiment.
Figure 7B:
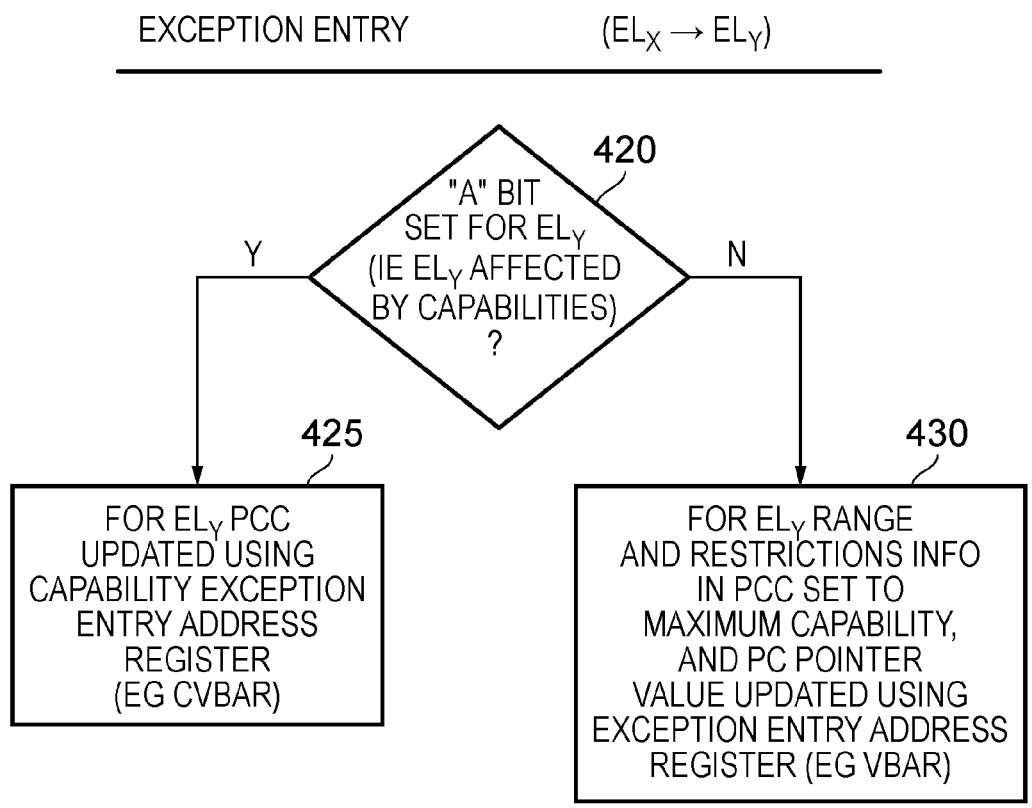

FIG. 7A illustrates the steps performed on exception entry from an exception level X to an exception level Y, in order to determine what execution state of the source exception level X should be saved. At step 400, it is determined whether the A bit is set for the source exception level X, i.e. whether exception level X is affected by capabilities. If it is, then the process proceeds to step 405 where the capability state for exception level X is captured. As discussed earlier, this will mean that the contents of the current process state register (CPSR) for exception level X is saved into a saved process state register (SPSR) 72 accessible to exception level Y. However, in addition, the current program counter capability stored within the PCC register 80 needs to be used to identify a preferred return address capability for the source exception level X. The preferred return address will be dependent on the type of exception, but will typically be the program counter value, or the program counter value plus 4 (assuming byte sized addressing, and 32-bit instructions). In addition to the preferred return address, the remaining capability information from the current program counter capability will also be copied into the return address capability generated from the PCC. In one embodiment, the return address capability generated in this manner will be stored within a dedicated return address capability register, in one particular embodiment this being the capability exception link register (CELR) 78).

However, if at step 400 it is determined that the A bit is not set, meaning that software executing at the source exception level is not affected by capabilities, then whilst it is still the case that the current process state 74 for the exception level X is saved into the saved process state 72, there is no need to save a capability to form the return address information. Instead, a preferred return address can be calculated from the program counter value 82 and saved within a suitable return address storage element, in one embodiment this being the exception link register (ELR). However, no capability information needs to be extracted from the PCC register 80 since software executing at exception level X does not have its instruction fetches constrained by capabilities.

Whilst in one embodiment a separate CELR register 78 and a separate ELR register can be provided, in an alternative embodiment the same physical structure 78 can be used in both cases. When the process shown in FIG. 7A proceeds to step 410 due to the source exception level X being unconstrained by capabilities, the preferred return address derived from the PC value can be stored within the address field of the CELR, whilst in one embodiment at least one of the remaining fields is set to a first default value. For example, with reference to the earlier mentioned tag bit discussed with reference to FIG. 3, the tag bit associated with the CELR register 78 can be cleared in such an instance to identify that the CELR does not store a valid capability, the hardware then merely referencing the portion of the CELR that stores the return address information when later retrieving that information on an exception return. In an alternative embodiment, all of the remaining fields in the CELR register 78 can be cleared, for example by zero extending the preferred return address stored into the CELR register 78 at step 410.

In addition to determining what execution state for the source exception level X needs to be saved on exception entry, it is also necessary to determine suitable execution state for the destination exception level Y, and in particular it is necessary to determine an initial program counter capability or value to store within the PCC register 80. This process is shown schematically in FIG. 7B.

As shown, at step 420 it is determined whether the A bit is set for the destination exception level Y, i.e. whether the destination exception level is affected by capabilities. If so, the process proceeds to step 425, where the program counter capability register 80 is updated using exception entry address capability information stored in a capability control storage element 79 shown in FIG. 1. In particular, the register 79 will store information about the appropriate address to be used on exception entry, and also associated capability information to be provided in addition with that address to form a program counter capability to be stored within the PCC register 80. The exception entry address information in the register 79 can take a variety of forms, but in one embodiment the register 79 takes the form of a capability vector base address register (CVBAR). This register provides a base address for exception entry, and the exception determines an offset from this base address in dependence on the exception type. Hence, information about the type of exception will be used to identify the appropriate address to be used to form the program counter capability loaded into the PCC register 80, with the remaining portion of the capability information for the PCC register being formed from the corresponding portion of the capability in CVBAR.

If the A bit is not set for the destination exception level Y, this means that exception level Y is not affected by capabilities, and accordingly a program counter capability is not required. Instead, it is merely necessary to form an initial program counter value to be loaded into the field 82 of the PCC register 80. Hence, in one embodiment, as shown by step 430, in this scenario the range and restrictions information in the fields 84, 86 of the PCC register 80 are set to identify a maximum capability, and the PC pointer value 82 is updated using information obtained from the exception entry address register 79. In this example, a non-capability exception entry address register is referred to, which in one embodiment may be a vector base address register (VBAR). In one particular embodiment, the VBAR register is formed in the lower 64 bits of the CVBAR register, allowing both CVBAR and VBAR registers to share the same physical storage structure.

However, in an alternative embodiment it may not be necessary to set the range and restriction information in the PCC register 80 to identify the maximum capability. For example, if the hardware is arranged so that when the current exception level is not affected by capabilities, it ignores the range and restriction information 84, 86 within the PCC register 80, then the range and restriction information may instead be left unchanged, or cleared, as desired. However, in embodiments where the entirety of the PCC register 80 is referred to in all situations, by setting the range and restrictions information to identify the maximum capability, this will ensure that the software executing in the destination exception level is unconstrained by capabilities.

Figure 8:
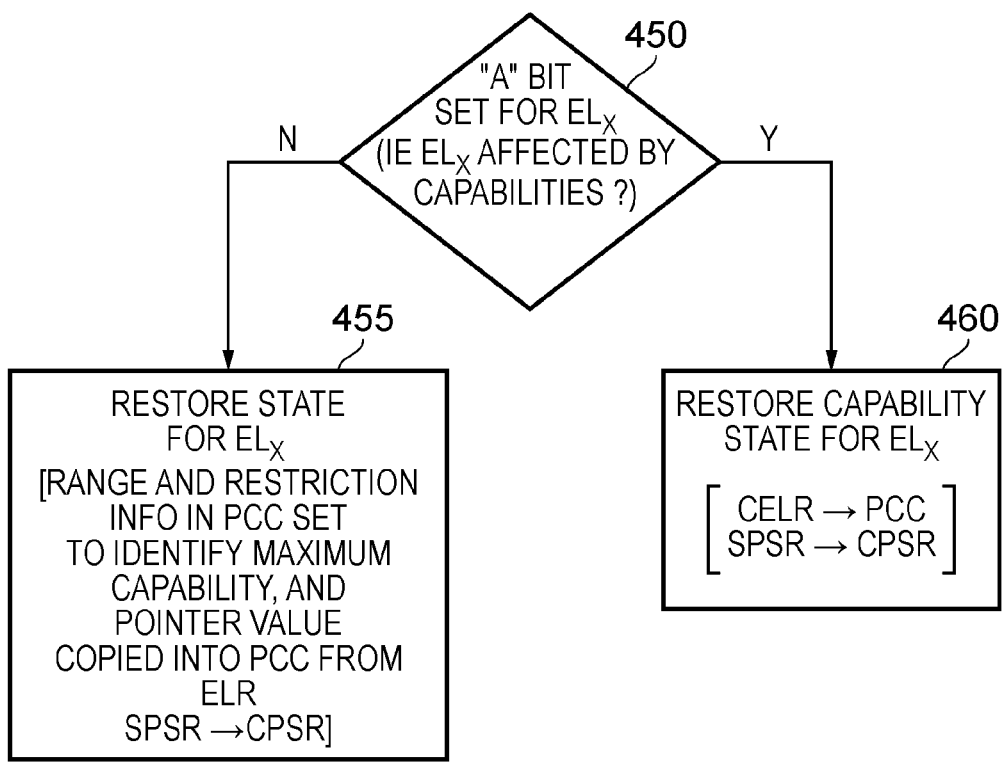
FIG. 8 is a flow diagram illustrating how execution state of the processing circuitry is managed during an exception return operation in accordance with one embodiment.

FIG. 8 is a flow diagram illustrating steps taken during return from an exception. In this instance it is assumed that the source exception level is exception level Y and the destination exception level is exception level X. At step 450, it is determined whether the A bit is set for the destination exception level X. If it is, then the process proceeds to step 460, where the capability state is restored for the destination exception level. This essentially reverses the steps taken at step 405 in FIG. 7A, by restoring the contents of the CELR register 78 into the PCC register 80, and restoring contents of the SPSR register 72 into the CPSR register 74 for exception level X.

However, if it is determined that the A bit is not set for the destination exception level X, meaning that exception level X is not affected by capabilities then the process proceeds to step 455. Here the (non-capability) state is restored for exception level X. In one embodiment, this again involves the SPSR contents being restored into the CPSR contents for exception level X. However, with regards to the PCC register 80, in one embodiment the range and restriction information is set to identify the maximum capability, and the pointer value field 82 is populated using the information from the ELR. In much the same way as discussed earlier with reference to step 430 of FIG. 7B, in some embodiments, as an alternative to setting the range and restriction information to identify the maximum capability, it may instead be possible merely to leave the range and restriction information "as is" or to clear that information, provided the hardware will not refer to that information in situations where the current exception level is not affected by capabilities.

In the embodiments described hereafter, the earlier-mentioned capability configuration information stored within the per exception level capability configuration register 76 can also be used for an additional purpose, in particular to influence the form of result generated when executing certain types of instructions. In particular, in one embodiment the earlier mentioned A bit can be used as capability usage information, and when certain types of instruction are executed by the processing circuitry the processing circuitry will make reference to that capability usage information in order to determine whether the result generated should be generated as a capability or as an integer value. In particular, in one embodiment, if the A bit indicates that the associated exception level is affected by capabilities, then when certain types of instruction are executed, the processing circuitry will cause the result to be generated in the form of a capability. Conversely, if the A bit indicates that the associated exception level is not affected by capabilities, then when executing such instructions the processing circuitry will generate the result in the form of an integer value.

Whilst for the following description it will be assumed that the A bit information is used as the capability usage information, in alternative embodiments other information may be maintained for this purpose. For example, a separate dedicated control bit could be provided to form the capability usage information, which can be set or cleared to indicate the capability state or the non-capability state, respectively. Alternatively, a combination of existing bits may be used to derive the capability usage information, and in particular whether the processing circuitry is operating in the capability state or the non-capability state.

Irrespective of how the capability usage information is formed, it will be appreciated that by using such information to influence how a particular instruction is executed, and in particular whether that instruction generates a capability or an integer value as its result, this can allow for configurable execution of a single instruction, avoiding the need to provide both capability and non-capability instructions for the required operation. This can be very useful in situations where the instruction set encoding space is already heavily used, and accordingly where it is difficult to free up sufficient space to encode both capability and non-capability variants of instructions.

Figure 9:
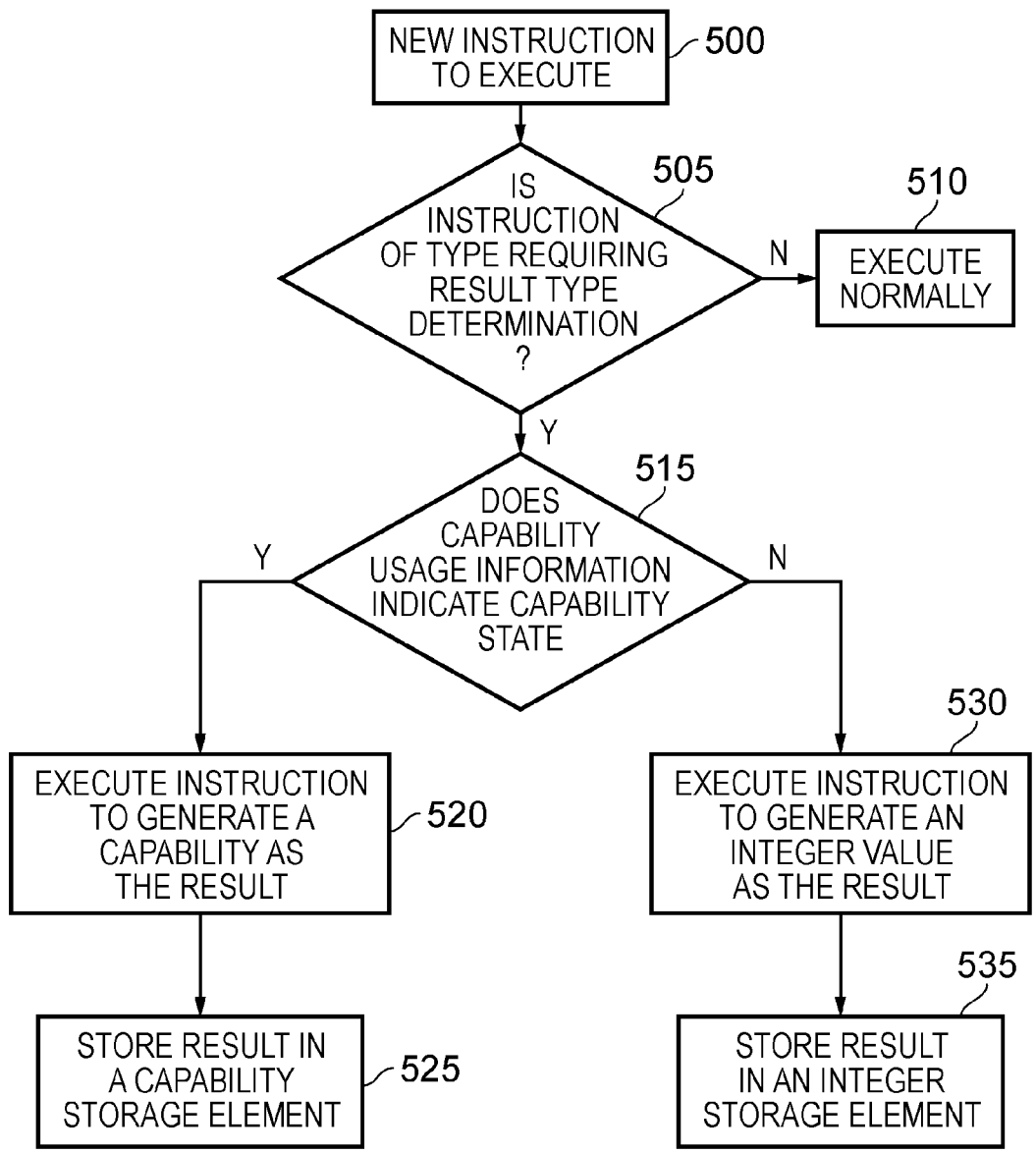
FIG. 9 is a flow diagram illustrating how execution of an instruction may be controlled in dependence on capability usage information in accordance with one embodiment.

FIG. 9 is a flow diagram illustrating operations performed by the processing circuitry when executing instructions in accordance with one embodiment. At step 500, it is determined that there is a new instruction to be executed, whereafter at step 505 it is determined whether that instruction is of a type that requires a result type determination to be made with reference to the capability usage information. In particular, the technique whereby a determination is made as to whether the result of executing an instruction should be produced in the form of a capability or an integer value can be restricted to certain types of instructions if desired. In one embodiment, an example of the types of instructions that the technique may be used for are instructions that generate some form of address as a result. In capability-based architectures, it desirable for such address information to be generated as a capability, since this can then be used to tightly constrain how that address information is used. However, for backwards compatibility, it would still be useful to allow instructions to generate address information as an integer value, and the techniques described herein allow the same instruction to be used for both purposes, with the capability usage information being arranged to configure, at the time the instruction is executed, whether the result is produced as a capability or as an integer value.

If it is determined at step 505 that the instruction is not of a type that requires a result type determination to be made, then the process proceeds to step 510 where the instruction is executed normally. However, if at step 505 it is determined that a result type determination does need to be made, then at step 515 the capability usage information is referred to by the processing circuitry in order to determine whether that capability usage information indicates a capability state or a non-capability state. As mentioned earlier, in one embodiment where the A bit is used as the capability usage information, then when the A bit is set to identify that the current exception level is affected by capabilities, this will indicate the capability state. Conversely, if the A bit is clear to indicate that the current exception level is not affected by capabilities, then this will indicate the non-capability state.

If at step 515, it is determined that the capability usage information indicates the capability state, then at step 520 the instruction is executed in a manner that generates a capability as the result. At step 525, the result is then stored in a capability storage element.

If the capability usage information does not indicate the capability state at step 515, then instead the process proceeds to step 530 where the instruction is executed in a manner to generate an integer value as the result. Then, at step 535, that result is stored in an integer storage element.

The capability storage element or integer storage element chosen as the storage element in which to store the capability or integer value, respectively, will depend on the type of instruction being executed. For example, in some embodiments the result produced as an updated program counter, and this can be stored as a program counter capability within the PCC register 80 when the capability usage information indicates the capability state, or alternatively can be stored as a program counter value within a program counter storage element when the capability usage information indicates the non-capability state. In one embodiment, the capability register may be formed as a field within the program counter capability register 80, for example the field 82 storing the program counter pointer value.

In other embodiments, the result may be stored in a general purpose register, and hence when the result is a capability it may be stored within one of the capability registers 60, whereas when the result is generated as an integer value it can be stored within one of the general purpose registers 40. As discussed earlier in connection with FIG. 1, in one embodiment the same physical storage may be used to provide both the general purpose registers 40 and the capability registers 60, and accordingly a general purpose register can be formed by a field within the associated capability register, for example the field 62.

Figure 10A:
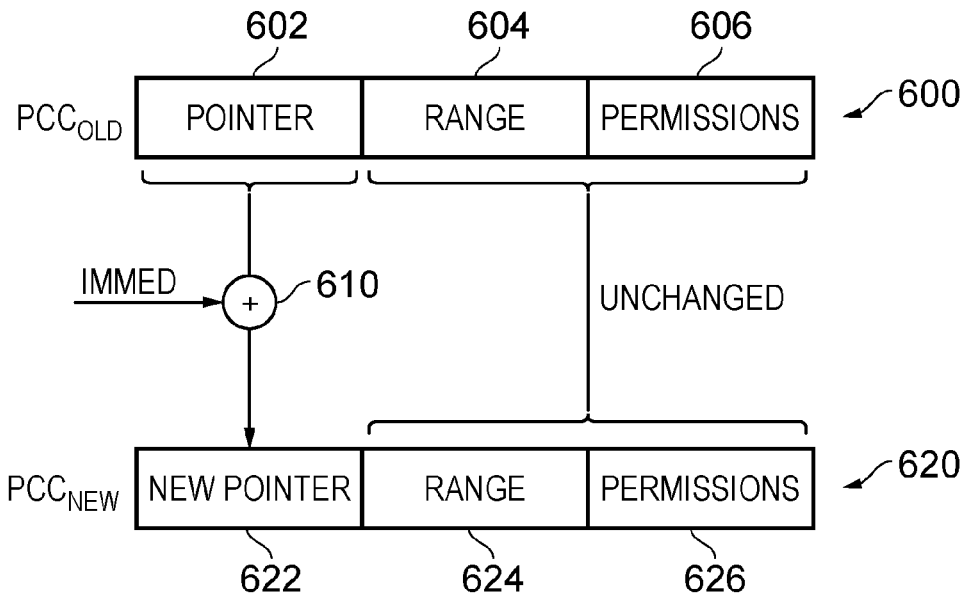
FIGS. 10A and 10B illustrate how execution of a branch instruction may be controlled in dependence upon whether capability usage information identifies a capability state or a non-capability state, in accordance with one embodiment.
Figure 10B:
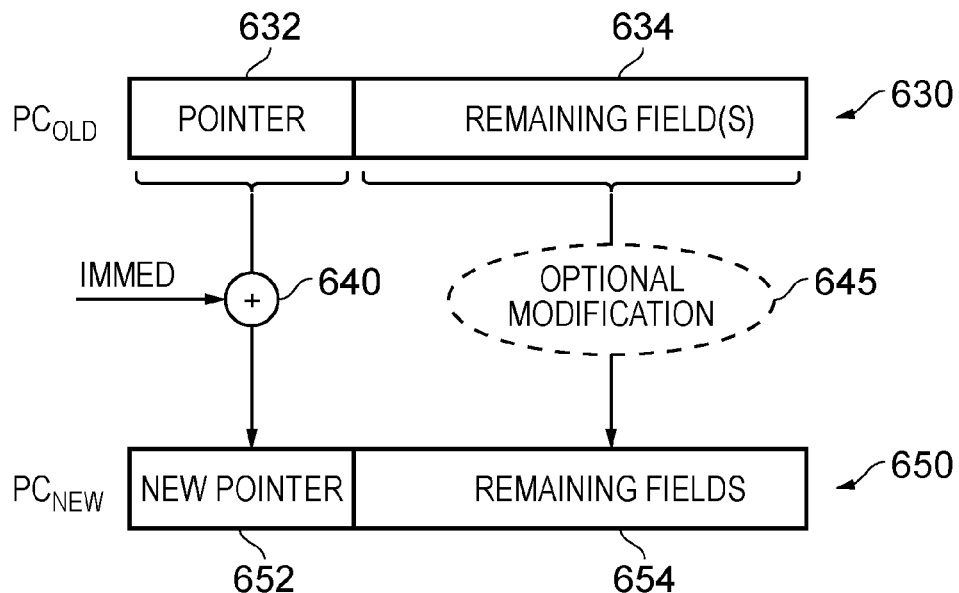

The above described technique of FIG. 9 can be applied to a variety of different instructions. FIGS. 10A and 10B illustrate one example, where the instruction is a branch immediate instruction. Such an instruction specifies as a source operand an immediate value encoded directly within the bit encoding space of the instruction. Such an immediate value can occupy a significant part of the instruction encoding space, and accordingly it is desirable not to have to replicate the instruction twice, once for a version that generates a capability as a result and once for a version that generates an integer value as a result. By using the technique of FIG. 9, this is avoided.

In particular, as shown in FIG. 10A, when the branch immediate instruction is executed, it will be determined whether the capability usage information indicates a capability state, which as discussed earlier will be the case in one embodiment when the A bit is set. If so, then the current program counter capability 600 will be modified in order to generate a new program counter capability 620. In particular, the original pointer value 602 will be logically combined with the immediate value, for example by performing an addition 610, in order to generate a new pointer value 622. In one embodiment, the range and permissions information 604, 606 in the original program counter capability will be replicated within the new program counter capability 620, as indicated by the fields 624 and 626.

However, as shown in FIG. 10B, if when the same instruction is executed, the capability usage information indicates the non-capability state, which in one particular embodiment will be the case when the A bit is clear, then the result is generated as a program counter value (i.e. an integer value), rather than a program counter capability. In the particular embodiment shown, it is assumed that the program counter integer value is still stored within the program counter capability register 80, and in particular within the field 82 shown in FIG. 1. Hence, the original program counter value will be given by the field 632 within the PCC register contents 630. That value will be subjected to a logical operation in combination with the immediate value, for example an addition 640, in order to generate a new pointer value stored in the field 652 of the updated PCC register contents 650. The remaining fields 634 in the original program counter capability content 630 may merely be replicated in the new program counter capability contents 650, as indicated by the remaining fields 654, or alternatively may be subjected to some optional modification as indicated by the element 645 in FIG. 10B. For example, in one embodiment the remaining fields 654 may be set to represent a maximum capability, so that the new program counter value is effectively unconstrained by capabilities. Alternatively, the earlier-mentioned tag bit discussed with reference to FIG. 3 may be cleared so as to identify that the contents of the program counter capability register do not store a valid capability. In one embodiment, it can be assumed in that case that the pointer value in the field 652 still represents a valid program counter integer value.

However, in an alternative embodiment it may not be necessary to take such steps. For example, if the hardware is arranged so that when the current exception level is not affected by capabilities, it ignores the range and restriction information within the PCC register 80, then the range and restriction information may instead by left unchanged, or cleared (for example by zero extending into those remaining fields), as desired.

Figure 11A:
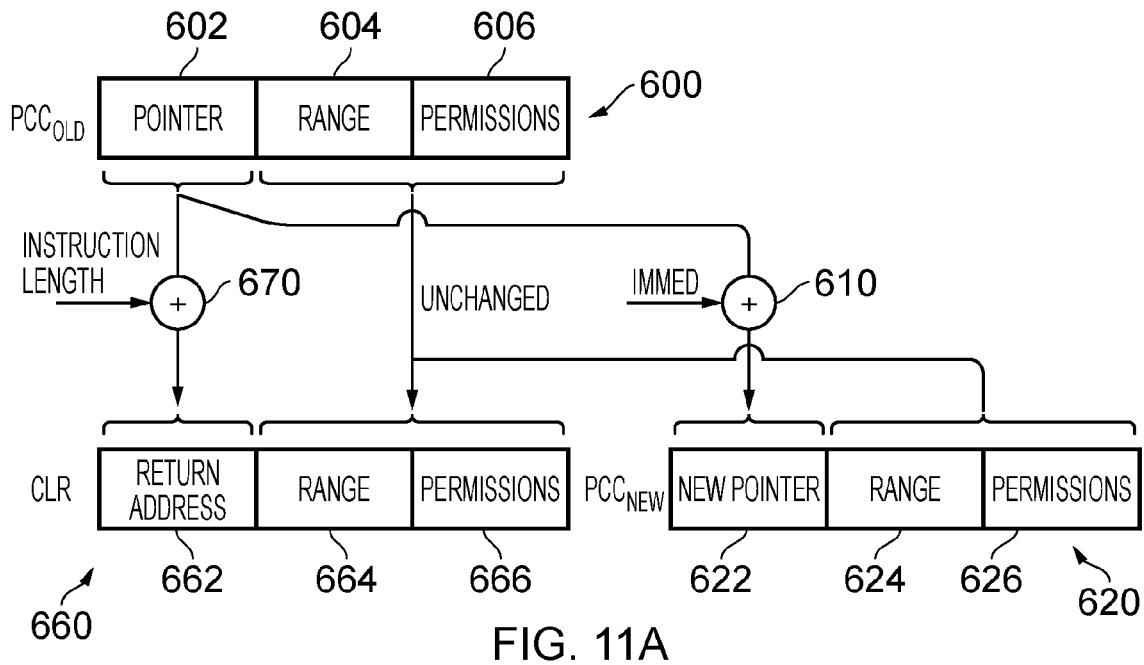
FIGS. 11A and 11B illustrate how execution of a branch with link instruction may be controlled in dependence upon whether the capability usage information indicates a capability state or a non-capability state, in accordance with one embodiment.
Figure 11B:
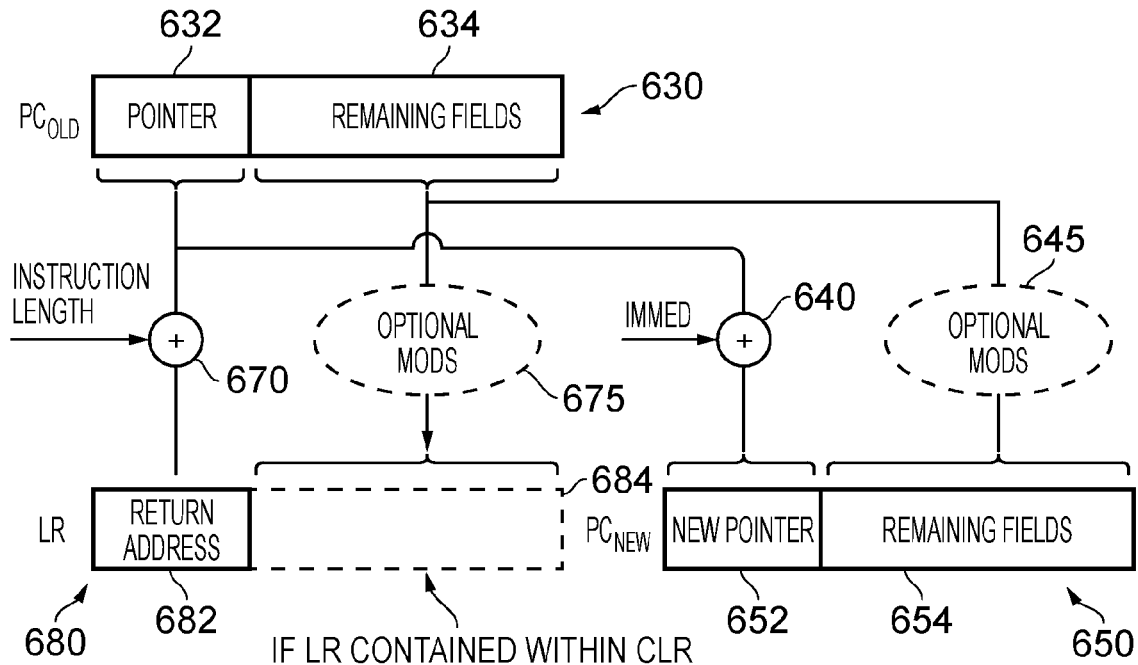

FIGS. 11A and 11B illustrate the configurable execution of another type of branch instruction, namely a branch with link immediate instruction. Execution of such an instruction results in performance of the functions discussed earlier with reference to FIGS. 10A and 10B, but also causes a link register to be populated with a return address, which in one embodiment may be configured to be a return address capability or a return address integer value dependent on the capability usage information.

In FIGS. 11A and 11B, the same reference numerals have been used to refer to the elements that are common with FIGS. 10A and 10B. Accordingly, with reference to FIG. 11A, it will be seen that the new program counter capability 620 is generated in exactly the same way as discussed earlier with reference to FIG. 10A. In addition, a capability return address is generated for storing within a capability link register (CLR). In one embodiment, the capability link register may be a particular one of the capability registers 60 discussed with reference to FIG. 1, in one particular embodiment C$_{30}$. As shown in FIG. 11A, the return address to store within the field 662 is generated by adding an offset to the current pointer value 602 within the program counter capability that existed prior to the instruction being executed. In one embodiment, the instruction length is added to the pointer value, so that the return address effectively points to the next instruction following the branch with link instruction. This is indicated by the addition box 670 in FIG. 11A. As also shown in FIG. 11A, in one embodiment the range and permissions information in the fields 604, 606 of the original program counter capability are replicated within the fields 664, 666 of the capability link register holding the return address capability 660.

However, if the A bit is clear, indicating the non-capability state, then the processing performed is as illustrated in FIG. 11B. The new program counter value is generated in exactly the same way as discussed earlier with reference to FIG. 10B. In addition, a return address 682 is generated by adding the instruction length to the pointer value 632, as indicated by the addition element 670. This can be stored within a link register, that may be physically separate to the capability link register, and may in one embodiment be one of the general purpose registers 40. Alternatively, the link register may be provided by a field (effectively the field 682) within a capability link register 680, which also contains the additional fields 684. These remaining fields can be populated directly using the remaining fields data 634 from the original program counter capability 630, or may be subjected to some optional modifications, as indicated by the element 675. These optional modifications are essentially the same as discussed earlier for the optional modifications 645 that may be performed in respect of the remaining fields for the program counter. Hence, they can be set to identify the maximum capability, or the tag bit may be cleared to indicate that the capability link register does not store a valid capability. As a further alternative, those fields may be zero extended or left as is, if the hardware will in any case ignore the values in those fields.

Figure 12A:
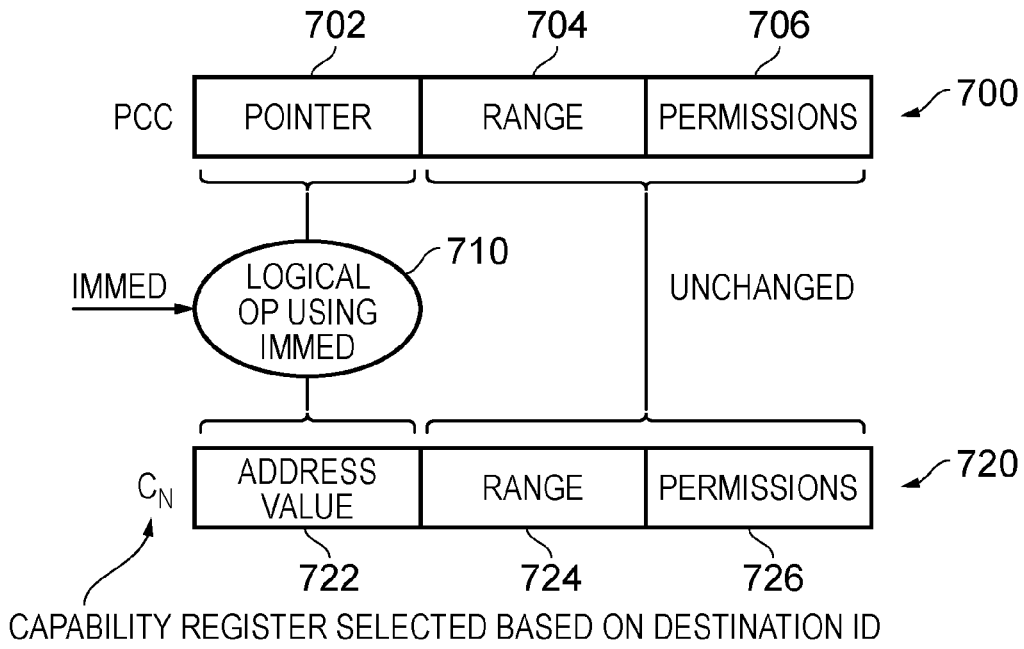
FIGS. 12A and 12B illustrate how execution of an address generation instruction may be controlled in dependence upon whether the capability usage information indicates a capability state or a non-capability state, in accordance with one embodiment.
Figure 12B:
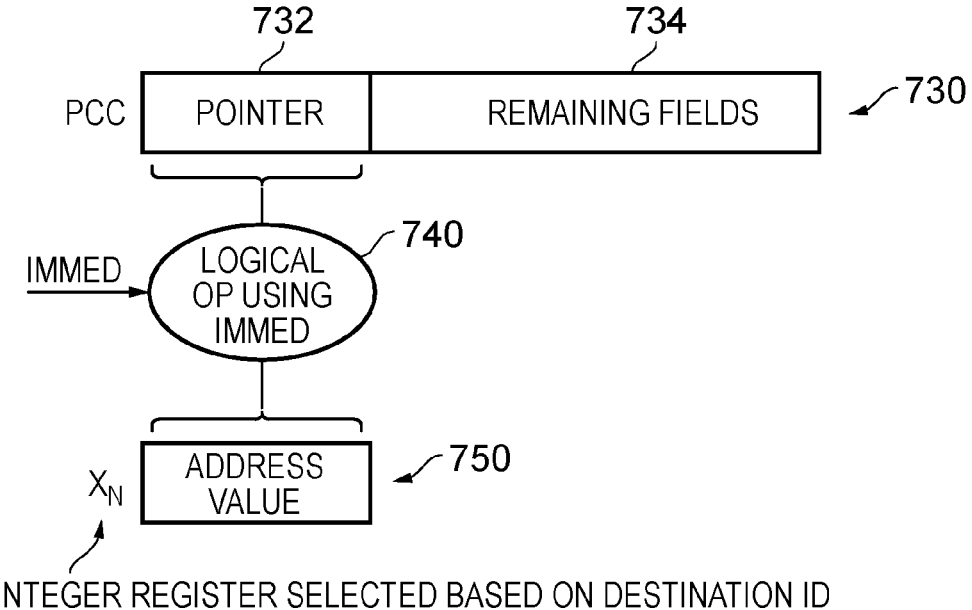

FIGS. 12A and 12B illustrate a yet further alternative embodiment where the instruction is not a branch instruction, but is an address generation instruction. In this example the address generation instruction specifies an identifier for the destination in which the result is to be written, and an immediate value to be used as a source operand.

As shown in FIG. 12A, if the instruction is executed whilst the A bit is set, then this will cause the address information generated to take the form of a capability, stored within a destination capability register C$_N$, where that capability register is selected based on the destination ID. Typically the capability register will be one of the general purpose capability registers 60 discussed earlier with reference to FIG. 1.

In this example, the pointer value 702 within the current program counter capability 700 will be subjected to a logical operation 710 using the specified immediate value, in order to generate the address value 722. The range and permissions information 704, 706 may in one embodiment be replicated within the fields 724, 726 of the result capability 720. The form of the logical operation 710 will depend on the type of address generation instruction. In a simple case, it may merely involve adding the immediate as an offset to the pointer value 702.

FIG. 12B illustrates the execution of the address generation instruction in the event that the A bit is clear. In this instance, the pointer value 732 in the current program counter capability 730 is subjected to a logical operation 740 using the immediate, with the result address value 750 then being stored within one of the integer registers X$_N$ (typically one of the general purpose registers 40), the particular register chosen being selected based on the destination ID specified within the address generation instruction. The remaining fields 734 of the program counter capability 730 are not used during execution of the address generation instruction in this instance.

From the above discussion of FIGS. 12A and 12B, it will be appreciated that the address generation instruction can be executed to generate either an address capability or an address integer value, dependent on the capability usage information.

The address generation instruction can take a variety of forms, but in one specific embodiment may take the form of either the ADR or ADRP instructions specified in the ARM instruction set used in processors designed by ARM Limited, Cambridge, United Kingdom.

Whilst in the examples of FIGS. 10A to 12B, the instructions given by way of example are all of the form that take an immediate as a source operand, it should be noted that the described techniques can also be used in association with instructions that do not use an immediate value as the source operand. In particular, branch variants taking absolute or PC(C) relative branch destinations in integer registers, and address generation variants taking absolute or PC(C) relative branch destinations in integer registers, are also possible, as are variants taking both integer registers and immediate values.

For example, the following types of instruction execution may be supported.

EXAMPLE 1

```
BranchRegister(bits(5) n, boolean link)
    Bits(64) addr = X[n];
    if CapabilitiesEnabled( ) then
        if link then
            CLR = PCC + 4;
        PCC = PCCWithAddress(addr);
    else
        if link then
            LR = PC + 4;
        PC = addr;
```

Example 1 above identifies a branch variant taking an absolute branch destination from an integer register, as indicated by the "BranchRegister" form. The value "bits(5) n" specifies a register index used to identify an integer source register, and the "boolean link" field is a one bit value identifying whether the instruction is a branch with link variant or not. A 64-bit address is then determined from the integer register X identified by the register index. If the capability usage information indicates that capabilities are enabled, then the program counter capability is updated so that the pointer value within PCC becomes the 64-bit address obtained from the integer register X, and the remaining fields are formed from the previous program counter capability. If the instruction is a branch with link instruction, then the capability link register is updated by adding the instruction length (in this case four bytes) to the current program counter capability. Conversely, if the capability usage information indicates that capabilities are not enabled, then the new program counter value is formed by the address value obtained from integer register X. If the instruction is a branch with link instruction, then the link register is updated by adding the instruction length to the current program counter value.

EXAMPLE 2

```
BranchRegisterRelative(bits(5) n)
    Bits(64) offset = X[n];
    if CapabilitiesEnabled( ) then
        PCC = PCC + offset; // adds offset to the address field in PCC
    else PC = PC + offset;
```

Example 2 identifies a branch variant taking a PC(C) relative branch destination from an integer register, as indicated by the "BranchRegisterRelative" form. Again, the value "bits(5) n" specifies a register index used to identify an integer source register. In this case, it is assumed that there is no "with link" variant of the instruction. A 64-bit address is then determined from the integer register X identified by the register index. If the capability usage information indicates that capabilities are enabled, then the program counter capability is updated so that the pointer value within PCC has the integer value from the integer register X added to it as an offset, in order to generate an updated pointer value, and the remaining fields are formed from the previous program counter capability. Conversely, if the capability usage information indicates that capabilities are not enabled, then the new program counter value is formed by adding the integer value from the integer register X as an offset to the current PC value.

From the above described embodiments, it will be seen that such embodiments provide an efficient mechanism for supporting both capability generating and integer value generating versions of particular instructions, but without having to encode those two different variants separately within the instruction encoding space. This provides a very efficient mechanism for supporting the execution of instructions to generate results as capabilities, whilst allowing for backwards compatibility where the same instructions can alternatively be executed to generate results as integer values.

Figure 13:
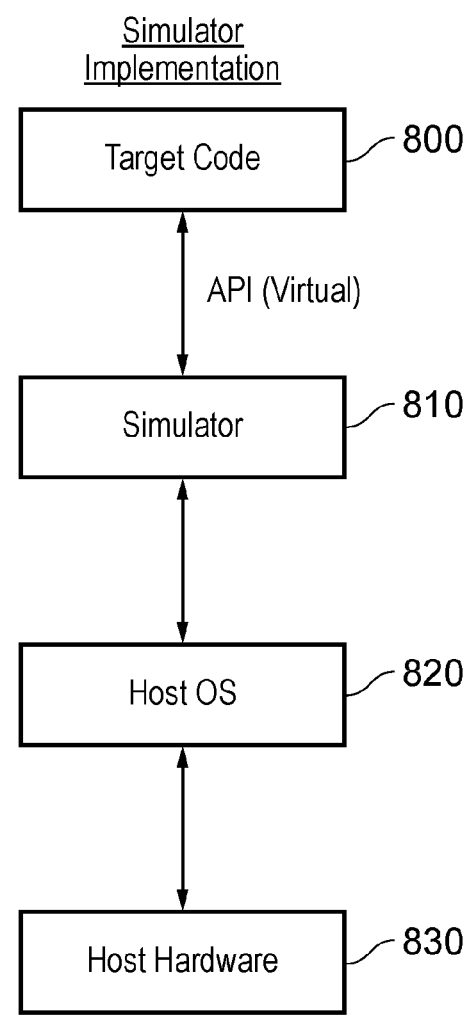
FIG. 13 illustrates a simulator implementation that may be used.

FIG. 13 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 830, optionally running a host operating system 820, supporting the simulator program 810. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 830), some simulated embodiments may make use of the host hardware, where suitable.

The simulator program 810 may be stored on a computer-readable storage medium (which may be a non-transitory medium), and provides a program interface (instruction execution environment) to the target code 800 (which may include applications, operating systems and a hypervisor) which is the same as the application program interface of the hardware architecture being modelled by the simulator program 810. Thus, the program instructions of the target code 800, including the instructions described above where execution is influenced by capability usage information, may be executed from within the instruction execution environment using the simulator program 810, so that a host computer 830 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute a sequence of instructions;
an integer storage element to store an integer value for access by the processing circuitry;
a capability storage element to store a capability for access by the processing circuitry; and
a capability usage storage to store capability usage information;
wherein the processing circuitry is responsive to execution of at least one instruction in the sequence of instructions to generate, in dependence on the capability usage information, a result to be stored in a destination storage element, by:
when the capability usage information identifies a capability state, generating the result as a capability and selecting the capability storage element as the destination storage element; and
when the capability usage information identifies a non-capability state, generating the result as an integer value and selecting the integer storage element as the destination storage element; and
wherein said at least one instruction comprises an instruction that specifies an immediate value as a source operand.

2. The apparatus as claimed in claim 1, wherein the integer storage element is one of a selected integer storage element of a plurality of integer storage elements, a program counter storage element, and a link storage element.

3. The apparatus as claimed in claim 1, wherein the capability storage element is one of a selected capability storage element of a plurality of capability storage elements, a program counter capability storage element, and a capability link storage element.

4. The apparatus as claimed in claim 1, wherein said at least one instruction comprises an instruction that is arranged to use program counter information as a further source operand.

5. The apparatus as claimed in claim 1, wherein the result generated is address information.

6. The apparatus as claimed in claim 1, wherein said at least one instruction is a branch instruction used to update program counter information.

7. The apparatus as claimed in claim 6, wherein the processing circuitry is arranged in response to the branch instruction to generate, as at least one result, updated program counter information, the processing circuitry being arranged, in dependence on the capability state, to generate the updated program counter information as a program counter capability for storage in a program counter capability storage element or to generate the updated program counter information as a program counter value for storage in a program counter storage element.

8. The apparatus as claimed in claim 7, wherein the processing circuitry is arranged to generate the updated program counter information by adjusting a current program counter value in dependence on an immediate value specified by the branch instruction.

9. The apparatus as claimed in claim 7, wherein the program counter storage element is formed by a field within the program counter capability storage element.

10. The apparatus as claimed in claim 6, wherein the branch instruction is a branch with link instruction, and the processing circuitry is arranged to generate, as at least one result, return address information derived from current program counter information, the processing circuitry being arranged, in dependence on the capability state, to generate the return address information as a return address capability for storage in a capability link storage element or to generate the return address information as a return address value for storage in a link storage element.

11. The apparatus as claimed in claim 10, wherein the processing circuitry is arranged to generate the return address information by modifying a current program counter value.

12. The apparatus as claimed in claim 10, wherein the link storage element is formed by a field within the capability link storage element.

13. The apparatus as claimed in claim 1, wherein said at least one instruction is an address generation instruction used to generate, as said result, address information derived from program counter information.

14. The apparatus as claimed in claim 13, wherein the processing circuitry is arranged to generate the address information by adjusting a current program counter value in dependence on an immediate value specified by the address generation instruction.

15. The apparatus as claimed in claim 13, wherein the address generation instruction provides a destination identifier, and the processing circuitry is arranged to map that destination identifier to a selected capability storage element of a plurality of capability storage elements when the capability usage information identifies the capability state, and to map that destination identifier to a selected integer storage element of a plurality of integer storage elements when the capability usage information identifies the non-capability state.

16. The apparatus as claimed in claim 1, wherein:
the integer storage element is formed by a field within the capability storage element, and when the integer value is stored as the result instead of the capability, at least one remaining field of the capability storage element is set to a default value.

17. The apparatus as claimed in claim 1, wherein the capability comprises a bounded pointer.

18. The apparatus as claimed in claim 1, wherein the capability usage information is capability configuration information for each of a plurality of exception levels, each exception level having different software execution privilege, and for each exception level the capability configuration information identifying at least whether the operations performed by the processing circuitry when executing instructions at that exception level are constrained by capabilities.

19. A method of controlling execution of instructions within an apparatus having processing circuitry to execute a sequence of instructions, an integer storage element to store an integer value for access by the processing circuitry, a capability storage element to store a capability for access by the processing circuitry, and a capability usage storage to store capability usage information, the method comprising:
responsive to execution of at least one instruction in the sequence of instructions, generating, in dependence on the capability usage information, a result to be stored in a destination storage element, by:
when the capability usage information identifies a capability state, generating the result as a capability and selecting the capability storage element as the destination storage element; and
when the capability usage information identifies a non-capability state, generating the result as an integer value and selecting the integer storage element as the destination storage element; and
wherein said at least one instruction comprises an instruction that specifies an immediate value as a source operand.

20. A non-transitory computer-readable storage medium storing a computer program for controlling a host data processing apparatus to provide an instruction execution environment comprising:
processing program logic to execute a sequence of instructions;
an integer data structure to store an integer value for access by the processing program logic;
a capability data structure to store a capability for access by the processing program logic; and
a capability usage data structure to store capability usage information;
wherein the processing program logic is responsive to execution of at least one instruction in the sequence of instructions to generate, in dependence on the capability usage information, a result to be stored in a destination data structure, by:
when the capability usage information identifies a capability state, generating the result as a capability and selecting the capability data structure as the destination data structure; and
when the capability usage information identifies a non-capability state, generating the result as an integer value and selecting the integer data structure as the destination data structure; and
wherein said at least one instruction comprises an instruction that specifies an immediate value as a source operand.

* * * * *